US006651037B1

(12) United States Patent  
Hall et al.

(10) Patent No.: US 6,651,037 B1
(45) Date of Patent: *Nov. 18, 2003

(54) METHOD OF OPTIMIZING DESIGN OF AN HVAC AIR-HANDLING ASSEMBLY FOR A CLIMATE CONTROL SYSTEM

(75) Inventors: Timothy J. Hall, Novi, MI (US); Steven Kelley Howell, Dexter, MI (US); Yuan (John) Li, Novi, MI (US)

(73) Assignee: Visteon Global Technologies, Inc., Dearborn, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 09/460,342

(22) Filed: Dec. 10, 1999

(51) Int. Cl.[7] .................................................. G06G 7/48

(52) U.S. Cl. ............................... 703/8; 703/1; 345/419

(58) Field of Search .......................... 703/7, 8; 706/45

(56) References Cited

U.S. PATENT DOCUMENTS

| | | | | |
|---|---|---|---|---|
| 4,696,225 A | * | 9/1987 | Weller | 454/158 |
| 4,912,657 A | | 3/1990 | Saxton et al. | 345/853 |
| 5,031,111 A | | 7/1991 | Chao et al. | 716/7 |
| 5,070,534 A | | 12/1991 | Lascelles et al. | 345/764 |
| 5,111,413 A | | 5/1992 | Lazansky et al. | 703/14 |
| 5,197,120 A | * | 3/1993 | Saxton et al. | 345/661 |
| 5,291,748 A | * | 3/1994 | Ueda | 62/179 |
| 5,293,479 A | * | 3/1994 | Quintero et al. | 345/841 |
| 5,754,738 A | | 5/1998 | Saucedo et al. | 706/11 |
| 5,799,293 A | * | 8/1998 | Kaepp | 706/45 |
| 5,856,828 A | | 1/1999 | Letcher, Jr. | 345/420 |
| 5,953,517 A | | 9/1999 | Yin et al. | 716/9 |
| 6,021,270 A | | 2/2000 | Hanaki et al. | 703/7 |
| 6,090,148 A | | 7/2000 | Weber et al. | 703/8 |
| 6,096,087 A | * | 8/2000 | Weber et al. | 703/8 |
| 6,110,216 A | | 8/2000 | Weber et al. | 703/8 |
| 6,113,643 A | | 9/2000 | Weber et al. | 703/8 |
| 6,113,644 A | * | 9/2000 | Weber et al. | 703/8 |
| 6,119,125 A | | 9/2000 | Gloudeman et al. | 707/103 |
| 6,209,794 B1 | * | 4/2001 | Webster et al. | 236/94 |
| 6,415,851 B1 | * | 7/2002 | Hall et al. | 165/42 |
| 6,420,698 B1 | | 7/2002 | Dimsdale | 250/234 |
| 6,477,517 B1 | | 11/2002 | Limaiem et al. | 706/45 |
| 6,477,518 B1 | * | 11/2002 | Li et al. | 706/45 |
| 6,482,082 B1 | * | 11/2002 | Derleth et al. | 454/156 |
| 6,487,525 B1 | * | 11/2002 | Hall et al. | 703/7 |

FOREIGN PATENT DOCUMENTS

EP 1 113 373 A2 7/2001

OTHER PUBLICATIONS

SAE Recommended Practice, "Passenger Car Windshield Wiper Systems–SAE J903c", Nov. 1973.
SAE Recommended Practice, "Motor Vehicle Driver And Passenger Head Position–SAE J1052", May 1987.
SAE Recommended Practice, "Driver Hand Control Reach–SAE J287", Jun. 1988.
SAE Recommended Practice, "Passenger Car Glazing Shade Bands–SAE J100", Mar. 1988.
SAE Recommended Practice, "Accommodation Tool Reference Point–SAE J1516", Mar. 1990.

(List continued on next page.)

Primary Examiner—Kevin J. Teska
Assistant Examiner—Fred Ferris, III
(74) Attorney, Agent, or Firm—Daniel J. Sepanik

(57) ABSTRACT

A method of optimized design of an HVAC air-handling assembly for a climate control system on a vehicle includes the steps of generating a basic design of the HVAC air-handling assembly and analyzing a performance of the basic design of the HVAC air-handling assembly using an engineering analytical technique. The method also includes the steps of varying the basic design of the HVAC air-handling assembly based on the performance analysis and using the optimized basic design of the HVAC air-handling assembly in generating the HVAC air-handling assembly design.

18 Claims, 6 Drawing Sheets

OTHER PUBLICATIONS

SAE Recommended Practice, "Driver Selected Seat Position–SAE J1517", Mar. 1990.

SAE Recommended Practice, "Truck Driver Shin–Knee Position For Clutch And Accelerator–SAE J1512", Mar. 1990.

SAE Recommended Practice, "Truck Driver Stomach Position–SAE J1522", Mar. 1990.

SAE Standard, "devices For Use In Defining And Measuring Vehicle Seating Accomodation–SAE J826", Jun. 1992.

SAE Recommended Practice, "Motor Vehicle Drivers' Eye Locations–SAE J941", Jun. 1992.

SAE Recommended Practice, "Passenger Car Windshield Defrosting Systems–SAE J902", Apr. 1993.

SAE Recommended Practice, "Windshield Wiper Systems–Trucks, Buses, And Multipurpose Vehicles–SAE J198", Jun. 1993.

SAE Recommended Practice, "Motor Vehicle Dimensions–SAE J1100", Jun. 1993.

SAE Recommended Practice, "Describing And Measuring The Driver's Field Of View–SAE J1050", Aug. 1994.

Lehner et al., "Distributed Virtual Reality: Supporting Remote Collaboration in Vehicle Design", IEEE 1997.

Purschke et al., "Virtual Reality–NewMethods for Improving and Accelerating the Development Process in Vehicle Styling and Design", IEEE 1998.

"The Introduction of Knowledge based Engineering for Design for Manufacture In the Automotive Industry", G.S. Wallace Successful Cases of Integrated Product Design with Manufacturing Technology (Digest No: 1997/168), IEE Colloquium on pp. 7/1–7/5, May 1997.

"Knowledge Based Total Product Engineering", A.P. Harper, Successful Cases of Integrated Product Design with Manufacturing Technology (Digest No.: 1997/168), IEE Colloquium on, pp. 5/1–5/2, May 1997.

* cited by examiner

METHOD OF OPTIMIZING DESIGN OF AN HVAC AIR-HANDLING ASSEMBLY FOR A CLIMATE CONTROL SYSTEM

BACKGROUND OF THE INVENTION

1. Field of the Invention

The present invention relates generally to computer-aided design of vehicles and, more specifically, to a method of optimized design of an HVAC air-handling assembly for a climate control system on a vehicle.

2. Description of the Related Art

The process of vehicle design, and in particular automotive vehicle design, involves several phases leading up to the manufacture of the vehicle. These phases are commonly known in the art as design, development, prototype, and test phases. These phases may occur sequentially or concurrently, depending upon the time available for the vehicle design process. Advantageously, an efficient design process for developing a new product offers a competitive advantage in the marketplace.

Within the design phase, there are several recognized sub-phases, including conceptual design, basic design, detailed design and drafting. The conceptual design involves the creation of a rough model, which is typically a two-dimensional model. The basic design is a simplified geometric representation of the conceptual model, and is generally shown as a three-dimensional solid model. The detailed design is a further refinement of the basic model including detailed features, such as a three-dimensional solid model. The engineering analysis typically utilizes the detailed design for analytical purposes. The drafting phase is a drawing of the detailed model for manufacturing purposes, such as a second two-dimensional drawing, with the results of the engineering analysis incorporated within the detailed model.

Vehicle design, and in particular automotive vehicle design, has advanced to a state in which computer-aided design techniques are frequently utilized to develop the new vehicle in a virtual environment. Computer-aided design is especially beneficial in optimizing the various systems incorporated within a vehicle, to maximize design and functional capabilities of the vehicle systems. One example of a vehicle system is a climate control system, which maintains the temperature of an occupant compartment of the vehicle at a comfortable level by providing heating, cooling and ventilation. Air-handling for the climate control system is carried out by an integrated mechanism referred to in the art as a heating, ventilation and air conditioning (HVAC) assembly.

One aspect of the overall design task for a vehicle system, such as the climate control, is to ensure that the design of the vehicle system is spatially compatible with a particular environment. Another aspect of the design task is to ensure that the design complies with predetermined functional criteria, including performance and durability requirements. In the past, various methods have been utilized to determine whether a proposed design meets such predetermined parameters. For example, a proposed design may be analyzed in two dimensions, which requires many iterations of a drawing. A three-dimensional model may also be constructed to obtain a better perspective of the design. The three-dimensional model may also undergo testing to determine whether it complies with performance and durability criteria. This design method is time consuming and expensive.

It is also known that knowledge-based design methods are being utilized in designing a vehicle system. The knowledge-based design method provides advice to the user of the method learned from knowledge guidelines based on lessons learned from previous designs, and engineering and manufacturing experience. Advantageously, knowledge-based design techniques maximize the amount of knowledge utilized, while developing a new vehicle system in a minimal period of time. The knowledge-based design techniques typically utilize a detailed design of the vehicle system to perform an engineering analysis. An example of a knowledge-based design technique is disclosed in U.S. Pat. No. 5,799,293 to Kaepp, entitled "Method For Optimizing The Design Of A Product Using Knowledge Based Engineering Techniques", the disclosure of which is hereby incorporated by reference.

It is also known to use a computer-aided design technique to design a vehicle system. An example of a computer aided design technique is disclosed in U.S. patent application Ser. No. 08/984,806, entitled "Method and System For Vehicle Design Using Occupant Reach Zones", the disclosure of which is hereby incorporated by reference. Another example is disclosed in commonly assigned U.S. patent application, Ser. No. 09/356,576, entitled "Method For Designing A HVAC Air-handling Assembly For A Climate Control System," the disclosure of which is hereby incorporated by reference.

While the above design techniques work well by utilizing a detailed parametric model developed from available architectures to analyze the performance of the model, they are time consuming. Therefore, there is a need in the art to provide a method of optimized of an HVAC assembly for a climate control system on a vehicle using a computer aided design and engineering technique that establishes the performance of the system using a newly generated basic model of the system.

SUMMARY OF THE INVENTION

Accordingly, the present invention is a method of optimized design of an HVAC air-handling assembly for a climate control system on a vehicle. The method includes the steps of generating a basic design of the HVAC air handling assembly and analyzing a performance of the basic design of the HVAC air handling assembly using an engineering analytical technique. The method also includes the steps of varying the basic design of the HVAC air-handling assembly based on the performance analysis and using the optimized basic design of the HVAC air-handling assembly in generating the HVAC air-handling assembly design.

One advantage of the present invention is that an improved method of optimized design of an HVAC air-handling assembly for a climate control system on a vehicle is provided that considerably reduces design time and related expenses. Another advantage of the present invention is that a method of optimized design of an HVAC air-handling assembly for a climate control system on a vehicle is provided that utilizes parametric automated design in light of predetermined design, manufacturing and engineering criteria. Yet another advantage of the present invention is that a method of optimized design of an HVAC air-handling assembly for a climate control system on a vehicle is provided that analyzes the performance of a basic design of the HVAC air-handling assembly. Still another advantage of the present invention is that a method of optimized design of an HVAC air-handling assembly for a climate control system on a vehicle is provided that includes optimized performance features in subsequent designs. A further advantage of the present invention is that a method of optimized design of an HVAC air-handling assembly for a climate control system on a vehicle is provided which enhances informed decision making regarding subsequent designs in light of performance objectives. Yet a further advantage of the present invention is that a method of optimized design of an HVAC air-handling assembly for a climate control system on a vehicle is provided that utilizes a simulation-based design evaluation to evaluate the performance and structural integrity of the design.

Other features and advantages of the present invention will be readily appreciated, as the same becomes better understood, after reading the subsequent description taken in conjunction with the accompanying drawings.

BRIEF DESCRIPTION OF THE DRAWINGS

FIG. 6 is an elevational view of a system for designing the HVAC air-handling assembly.

DESCRIPTION OF THE PREFERRED EMBODIMENT(S)

Vehicle design, and in particular the design of an HVAC air-handling assembly 10 (FIG. 2) for a climate control system on a vehicle, is achieved according to the present invention with a generic parametric driven design process. Advantageously, this process allows flexibility in vehicle design and engineering analysis of the vehicle design in a fraction of the time required using conventional design methods. Various computer-based tools are integrated to achieve this enormous time and expense savings, including solid modeling, parametric design, automated studies and a library.

Figure 1:
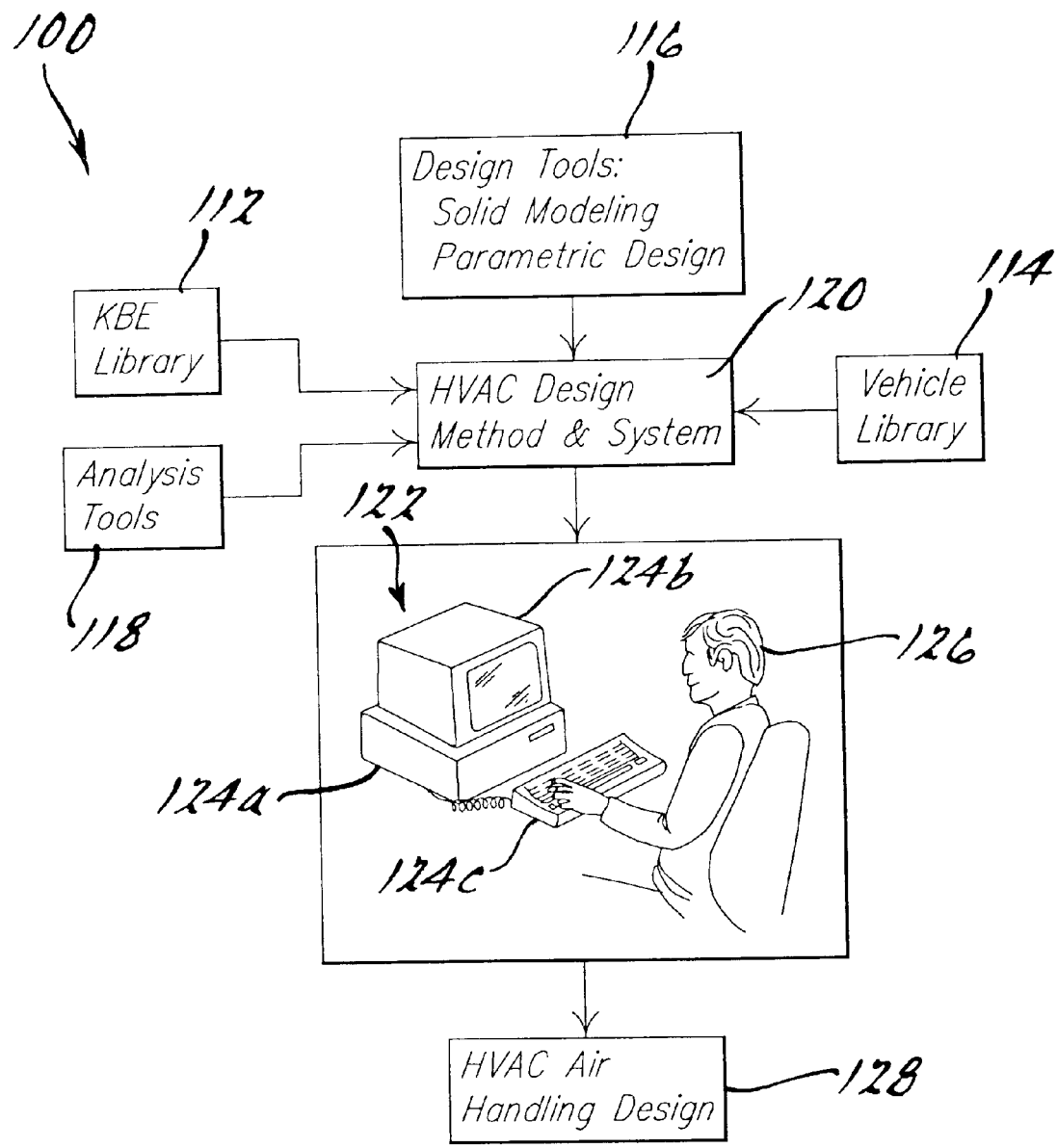
FIG. 1 is a block diagram of a system which may be utilized with a method of optimized design of an HVAC air-handling assembly for a climate control system on a vehicle, according to the present invention.

Referring to the drawings and in particular FIG. 1, the tools 100 used by a method for optimized design of the HVAC air-handling assembly 10 for a climate control system on a vehicle, according to the present invention, are illustrated graphically. The tools 100 include a library 112 stored on an electronic storage device (not shown). The library 112 is a database of sub-libraries providing an electronic representation of various experts' knowledge of information relevant to the design of the HVAC air-handling assembly 10 for a climate control system on a vehicle. The library 112 also includes design and assembly rules, guidelines and information in electronic form regarding various types of HVAC air-handling assembly architectures and component parts.

For example, the library 112 may include a component parts library. The component parts library may contain a parametric solid model of a particular component part, as well as parameters defining characteristics of the component part. A user 126 may select the parameters that are relevant to the design of the HVAC air-handling assembly 10. For example, a relevant vehicle system may include a condenser (not shown), fan (not shown), or engine (not shown).

The tools 100 also include a vehicle library 114 stored on the electronic storage device. The vehicle library 114 is an electrical representation of a vehicle model or a portion thereof. Advantageously, the vehicle library 114 may contain a parametric solid model of an exterior portion of a particular vehicle, or the HVAC air-handling assembly 10. In this example, the vehicle library 114 may include a parametric model of an occupant compartment portion of the vehicle.

Also, the vehicle library 114 may contain parameters defining various vehicles and vehicle system characteristics, such as interior size and vehicle body style. It should be appreciated that the vehicle library 114 may be a sub-library of the knowledge based engineering library 112.

The tools 100 may also include various computer-aided design tools 116, which can be used for the design method, to be described. These design tools 116 may include solid modeling and parametric design techniques. Solid modeling, for example, takes electronically stored vehicle model data from the vehicle library 114 and standard component parts data from the library 112 and builds complex geometry for part-to-part or full assembly analysis. Several modeling programs are commercially available and generally known to those skilled in the art.

The parametric design technique is used in the electronic construction of vehicle geometry within a computer system 122, to be described, for designing a vehicle system, such as the HVAC air-handling assembly 10. As a particular dimension or parameter is modified, the computer system 122 is instructed to regenerate a new vehicle or part geometry. The parametric HVAC air-handling assembly information, from the knowledge-based information engineering library 112, control and limit the design process in accordance with predetermined design parameters.

The tools 100 also include various computer-aided engineering (CAE) analysis tools 118. One example of an engineering analysis technique is computational fluid dynamics (CFD). Another example of an engineering analysis technique is finite element analysis (FEA). Several software programs are commercially available to perform the CFD or FEA analysis and are generally known to those skilled in the art.

The tools 100 further include the computer system 122, as is known in the art, to implement a method 120 of optimized design. The computer system 122 includes a processor and a memory 124a, which can provide a display and animation of a system, such as the HVAC air-handling assembly 10, on a display such as a video terminal 124b. Parametric selection and control for the design can be achieved by the user 126, via a user interactive device 124c, such as a keyboard or a mouse. The user 126 inputs a set of parameters and set of instructions into the computer system 122 when prompted to do so. The set of parameters and the set of instructions may be product specific, wherein other data and instructions non-specific to the product may already be stored in the memory 124a.

One example of an input method is a pop-up window with all current parameters, including an online description for the parameter and a current value therefore. For example, parametric values may be chosen from a table within a two-dimensional mode, since some vehicle designers prefer to view an assembly in sections which can be laid out on a drawing.

Once the computer system 122 receives the set of parameters and instructions from the user 126, and any information regarding related vehicle systems and information from the libraries 112, 114, design tools 116 and analysis tools 118, the computer system 122 utilizes a method 120, discussed in detail subsequently, to determine whether requirements have been met.

Advantageously, the computer implemented method of optimized design of the HVAC air-handling assembly 10, to be described, combines all of the foregoing to provide an efficient, flexible, rapid design of the HVAC air-handling assembly 10 for a climate control system on a vehicle. Further, the optimized HVAC air-handling assembly design 128 is an output of the method 120 and the optimized HVAC air-handling assembly design 128 is available for further analysis and study.

Figure 2:
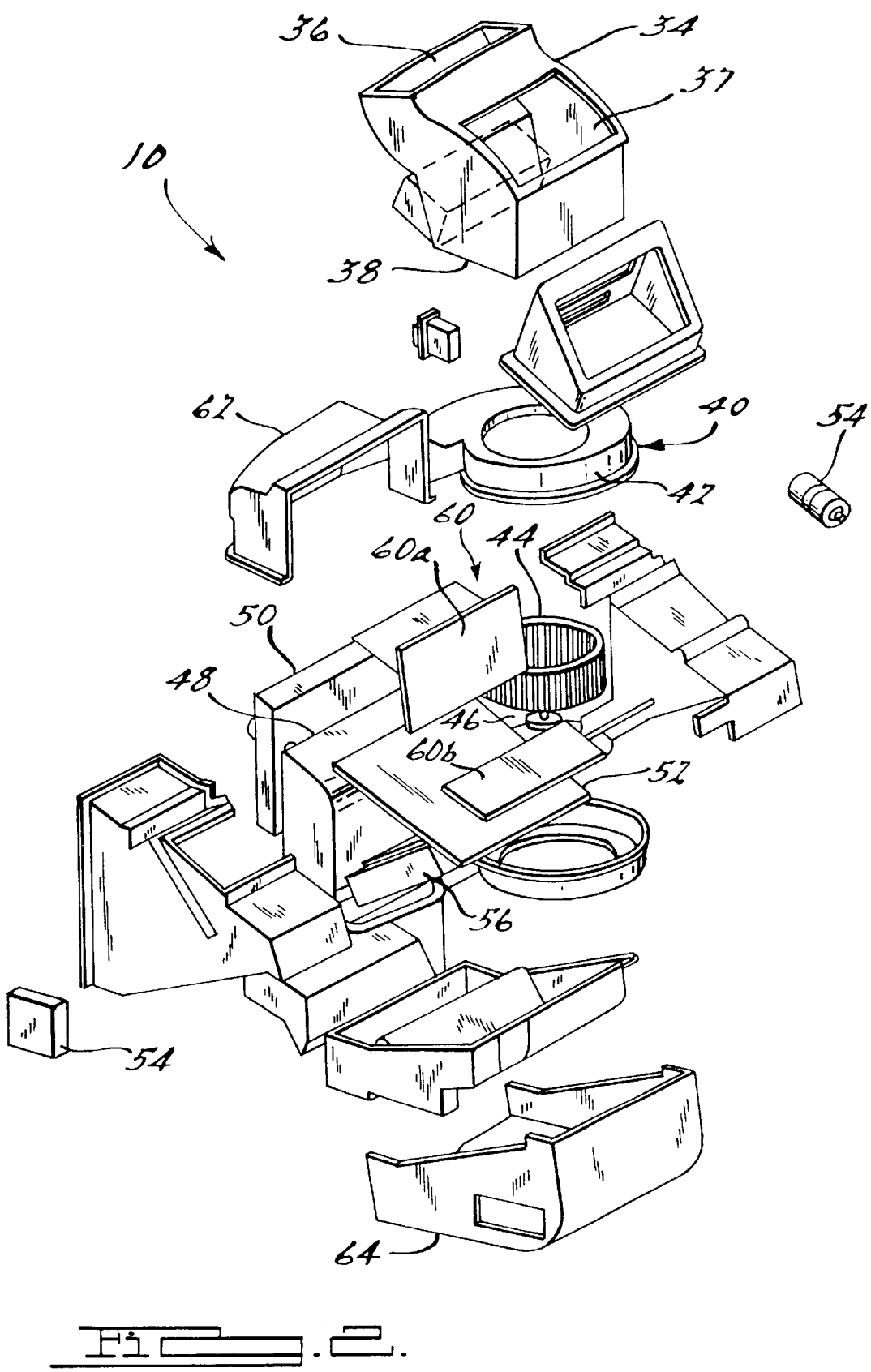
FIG. 2 is an exploded view of an HVAC air-handling assembly for a climate control system on a vehicle.
Figure 3:
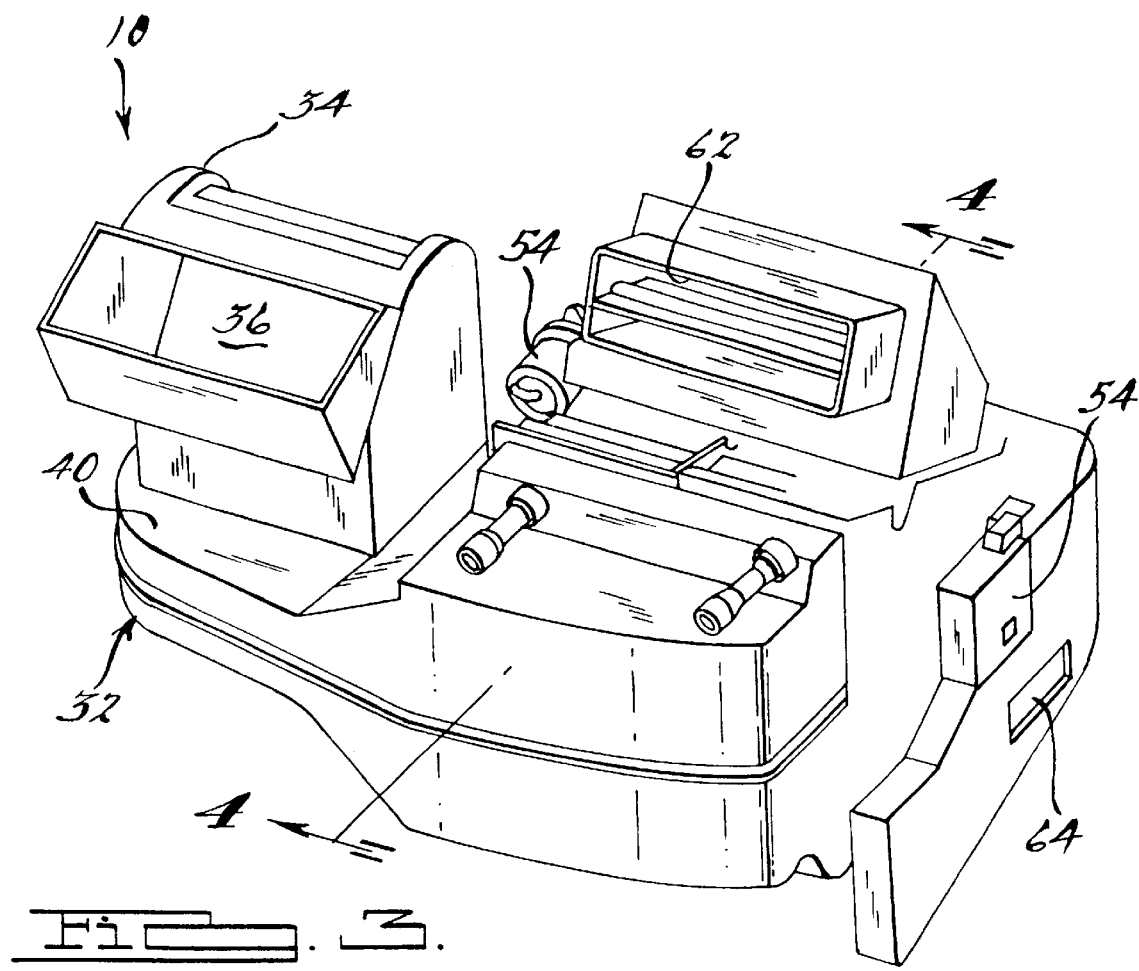
FIG. 3 is a perspective view of the HVAC air-handling assembly of FIG. 2.
Figure 4:
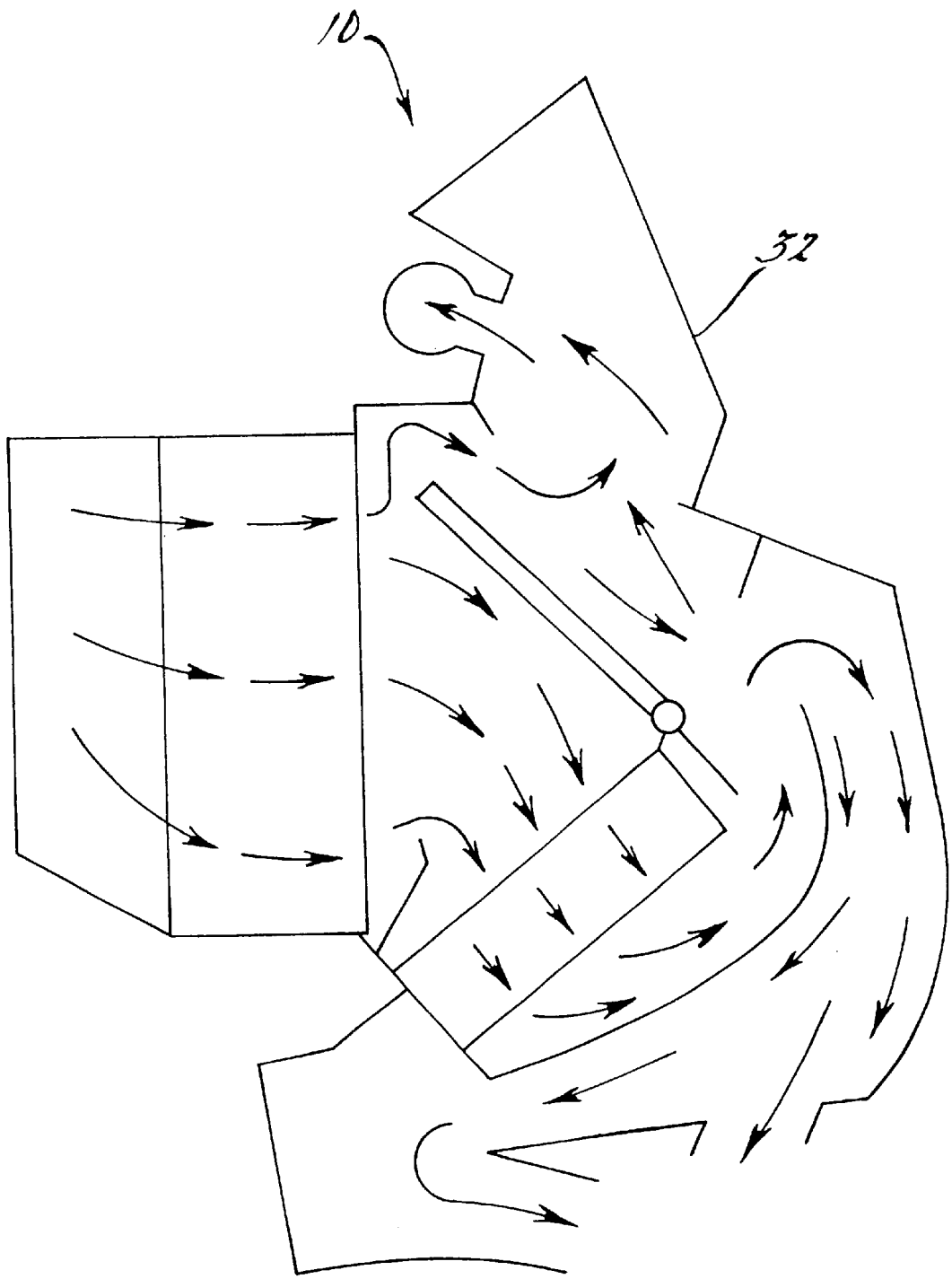
FIG. 4 is a sectional view taken along line 4—4 of FIG. 3 illustrating airflow through the HVAC air-handling assembly.

Referring to FIGS. 2 through 4, one embodiment of the HVAC air-handling assembly 10 for a climate control system (not shown) on a vehicle (not shown) is illustrated. The climate control system generally provides for heating, ventilation and air conditioning of an occupant compartment (not shown) of the vehicle. Advantageously, the climate control system provides for a comfortable interior temperature of the occupant compartment, and good visibility through the windshield (not shown) and other windows (not shown) of the vehicle. It should be appreciated that the interior temperature of the vehicle may be affected by factors such as occupant compartment temperature, ambient temperature, sunload, external air flow and heat radiation.

The climate control system also includes an air-flow handling system, referred to in the art as the heating, ventilation and air conditioning (HVAC) air-handling assembly 10. It should be appreciated that, in this example, the thermal management of the heating, cooling and ventilation functions is integrated into one system. The HVAC air-handling assembly 10 conditions a flow of air by heating or cooling the airflow and distributing the flow of conditioned air to the interior of the occupant compartment of the vehicle. It should be appreciated that, in this example, the HVAC air-handling assembly 10 is positioned on the occupant compartment side of a dash panel (not shown), and below an instrument panel (not shown). Also, in this example, the HVAC air-handling assembly 10 includes a case 32, having a preferred architecture, to package the individual component parts of the HVAC air-handling assembly 10, to be described.

The HVAC air-handling assembly 10 includes an air inlet duct 34. The air inlet duct 34 includes an interior chamber (not shown) that is hollow, for receiving air to be conditioned. The air inlet duct 34 includes an inlet opening to allow the ingress of air to be conditioned into the interior chamber. The air inlet duct 34 receives air from outside of the vehicle, or recirculated air from inside the occupant compartment of the vehicle.

In this example, there is an outside air inlet opening 36 for receiving outside air, such as through a vent located near a windshield portion of the vehicle and a recirculated air inlet opening 37 for receiving recirculated air from the occupant compartment. Preferably, the openings 36, 37 are covered by a door (not shown) that operatively controls the ingress of air. The door is actuable between multiple positions, including one hundred percent outside air and no recirculated air, one hundred percent (100%) recirculated air and no outside air, and a mixture of outside air and recirculated air. It should be appreciated that the size of the air inlet duct 34 and position relative to the case 32 is part of an HVAC assembly architecture. The air inlet duct 34 also includes an egress opening 38 for the air to leave the interior chamber of the air inlet duct 34.

The HVAC air-handling assembly 10 also includes a blower assembly 40 operatively connected to the egress opening 38 in the air inlet duct 34. The blower assembly 40 pulls air through the air inlet duct 34 and forces it through the rest of the HVAC air-handling assembly 10, in a manner to be described. The blower assembly 40 includes a scroll housing 42 having a wheel 44 and a motor 46, as it is known in the art. Preferably, the motor 46 is part of a centrifugal blower function for the blower assembly 40.

The HVAC air-handling assembly 10 further includes an evaporator core 48 operatively connected to the blower assembly 40, that receives the flow of air to be conditioned. Depending on the operational mode selected, the flow of air to be conditioned is either outside air, or recirculated air from the occupant compartment. It should be appreciated that, in this example, there is a filter 50 positioned between the blower assembly 40 and the evaporator core 48, to filter the air before it passes through the evaporator core 48. The evaporator core 48 cools and dehumidifies the air to be conditioned, by the thermodynamic transfer of heat from the air to be conditioned to a refrigerant, as is known in the art. The now conditioned air exits the evaporator core 48 and is distributed in a manner to be described.

The HVAC air-handling assembly 10 also includes a blend door 52 that diverts the flow of conditioned air leaving the evaporator core 48 to adjust the temperature of the air, depending on the selected operational and temperature modes. It should be appreciated that the blend door 52 may be actuated by an actuator 54. The actuator 54 may be electrically operated, mechanically operated, or vacuum operated, as is known in the art. The blend door 52 directs the flow of air either into a heater core 56, to be described, or to bypass the heater core 56, or partially through the heater core 56.

The HVAC air-handling assembly 10 includes a heater core 56 that receives a flow of air to be heated and a coolant fluid, which, in this example, is engine coolant as is known in the art. The heater core 56 heats the air by the thermodynamic transfer of heat from the coolant fluid.

The HVAC air-handling assembly 10 also includes an air mix door 60, in communication with a duct (not shown). The air mix door 60 directs the flow of conditioned air from the evaporator core 48, or heater core 56, or a combination of both, into the duct for distribution in the occupant compartment, depending on the selected air distribution mode. In this example, a first air mix door 60a operatively directs the flow of now conditioned air through a panel duct (not shown) in the instrument panel or floor duct (not shown) and into the occupant compartment. A second air mix door 60b operatively directs the flow of conditioned air through the panel duct or a defroster duct (not shown), and into the occupant compartment.

Preferably, the HVAC air-handling assembly 10 includes other component parts, such as valves (not shown) and switches (not shown), which are conventional and known in the art to operatively transfer and condition the airflow.

Figure 5:
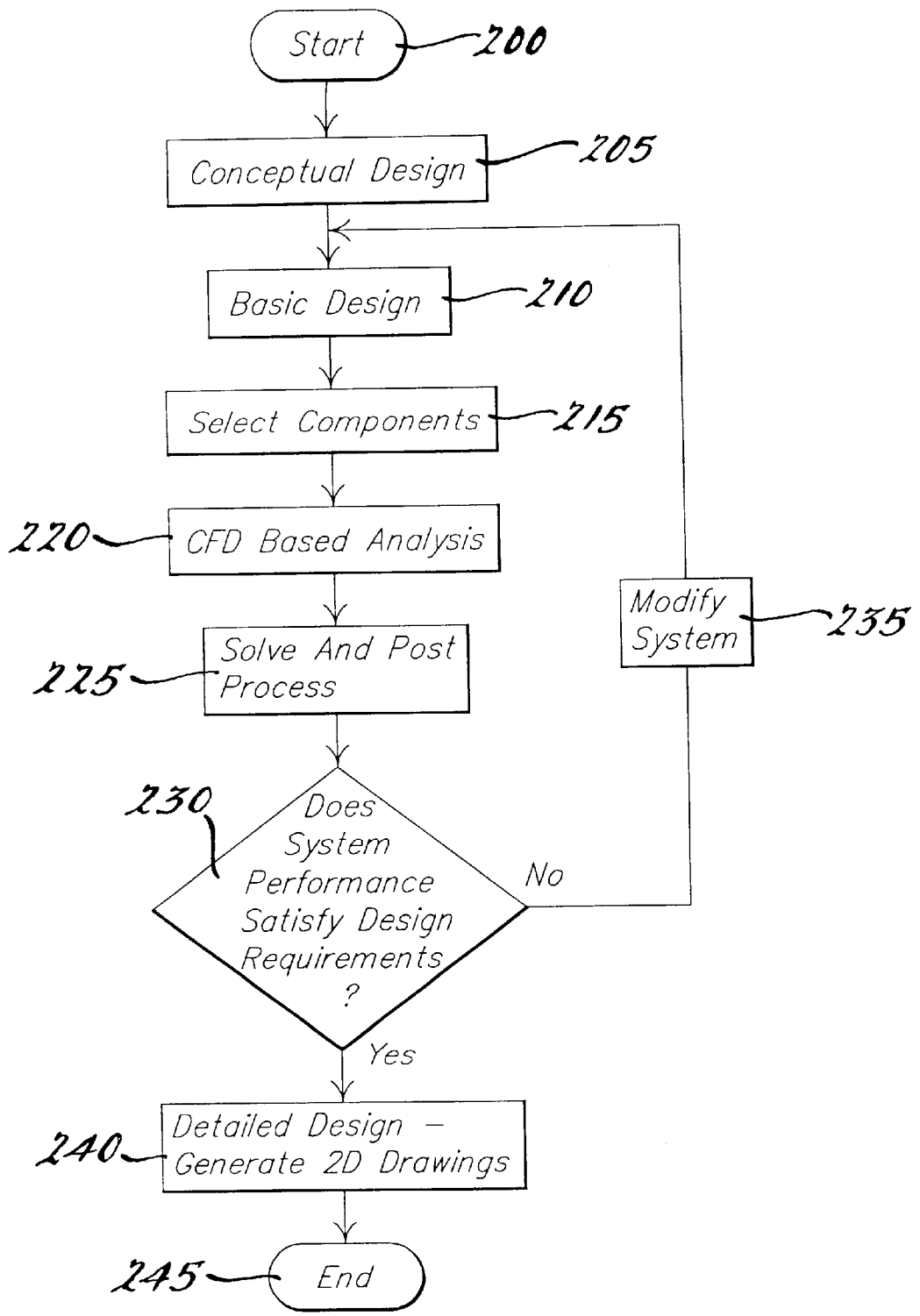
FIG. 5 is a flowchart of a method of optimized design of an HVAC air-handling assembly for a climate control system on a vehicle, according to the present invention.
Figure 10:
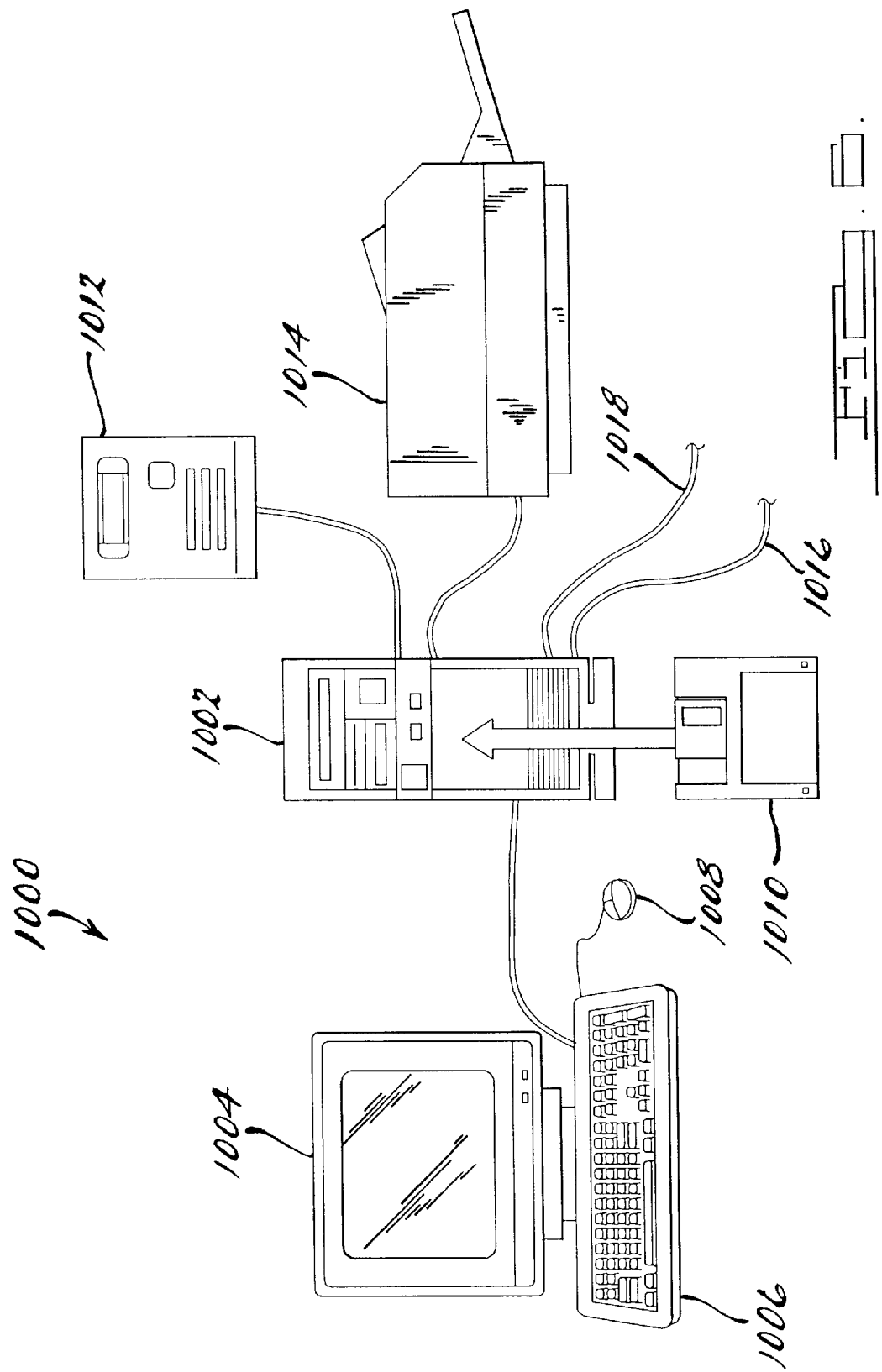

Referring to FIG. 5, a flowchart of a method of optimized design of the HVAC air-handling assembly 10, according to the present invention, is illustrated. The methodology starts or begins in bubble 200, when it is called for by the user 126. The methodology advances to block 205 and the user 126 generates a conceptual design of the HVAC air-handling assembly 10 for a climate control system on a particular vehicle type. The conceptual design is a two-dimensional representation of the HVAC air-handling assembly 10, or a portion thereof, within a particular vehicle environment. In this example, the conceptual design of the HVAC air-handling assembly 10 is a new model generated by a design tool 116 such as a computer aided design (CAD) technique, as is known in the art. Alternatively, a model of the HVAC air-handling assembly 10 may be obtained from a library 112, previously described. The methodology advances to block 210.

In block 210, the user generates a basic design of the HVAC air-handling assembly 10 using the design tool 116. It should be appreciated that the basic design may be a parametric model of the HVAC air-handling assembly 10, as defined by coordinates in space that reference the general shape of the HVAC air-handling assembly 10 and position the HVAC air-handling assembly 10 with respect to a parametric model of the instrument panel. In particular, these coordinate points define specific reference points on the HVAC air-handling assembly 10 for determining the shape and attachment of the HVAC air-handling assembly 10. The methodology advances to block 215.

In block 215, the user 126 selects components to be included in the model of the basic design of the HVAC air-handling assembly 10. Preferably, a geometric representation of surfaces that model the direction of airflow within the HVAC air-handling assembly 10 are included in the basic model, as shown by the arrows in FIG. 4. These surfaces may include that of the evaporator core 48 and heater core 56, interior surfaces of doors such as the air mix door 60, or blend door 52, and openings in ducts. It should be appreciated that a library 112 may be used to obtain the surfaces. The model for the basic design of the HVAC air-handling assembly design 10 is generated using the design tool 116 such as a computer aided design (CAD) technique. Preferably, the appropriate relationship between the HVAC air-handling assembly 10, instrument panel, vehicle body and other vehicle structures are automatically determined and based upon the parametric information provided.

It should be appreciated that packaging refers to an electronic representation of the dimensions of the system, device or component as it geometrically relates to a three-dimensional reference frame of the vehicle. These vehicle systems may include, but are not limited to the instrument panel, the dash panel, and the HVAC air-handling assembly 10. A vehicle system is intended to include any part of the vehicle which will interact with the HVAC air-handling assembly 10 either directly or indirectly.

From block 215, the methodology advances to block 220 and evaluates the model of the basic design of the HVAC air-handling assembly design using the analysis tool 118, such as computational fluid dynamics (CFD). CFD provide information regarding performance characteristics of the HVAC air-handling assembly 10, such as airflow, temperature distribution, temperature response, and airflow distribution. In this example, the CFD analysis automatically generates a mesh of the HVAC air-handling assembly 10 from the model of the basic design and automatically applies CFD boundary conditions. Preferably, the CFD generated model of the HVAC air-handling assembly 10 is associative to the geometric model of the basic design, such that as the geometric model is modified, the CFD model is automatically updated. Advantageously, the mesh of the basic design is a simpler mesh and quicker to analyze than a more complex system. The methodology advances to block 225.

In block 225, the methodology solves and post processes the CFD model of the HVAC air-handling assembly 10 to evaluate the system performance. The methodology advances to block 230. In block 230, the user 126 determines if the system performance satisfies a predetermined performance design criteria for the design of the HVAC air-handling assembly 10 based on the performance evaluation in block 225. Examples of a performance criteria include temperature distribution and airflow distribution.

If the performance does not satisfy the predetermined performance design criteria, the methodology advances to block 235. In block 235, the user 126 uses the design tool 116, such as computer aided design, to modify the model of the basic design. For example, the user 126 may change the geometry of a surface or specify a different component. Advantageously, the user 126 may modify the geometry of the HVAC air-handling system 10 and observe the performance impact. The methodology returns to block 210 previously described.

Returning to block 230, if the system performance optimally satisfies the predetermined performance design criteria, the methodology advances to block 240. In block 240, the methodology parametrically creates a detailed design of the HVAC air-handling assembly design from the optimized design using the design tool 116. For example, the user 126 may add additional features to the basic design of the HVAC air-handling assembly 10 from a feature library within the library 112. It should be appreciated that the additional features provide a more detailed representation of a surface within the HVAC air-handling assembly 10 and include features such as bosses and fasteners. Advantageously, the performance of the HVAC air-handling assembly 10 is optimized before the detailed design is generated, so that the system and any potential modification can be analyzed in a timely manner with minimal expense using the basic design of the HVAC air-handling assembly 10. The methodology advances to bubble 245 and ends.

Referring to FIG. 6, a representative system 1000 for implementing the method for optimized design of the HVAC air-handling assembly 10, according to the present invention, is illustrated. The system 1000 includes a processing unit 1002 connected to a user interface which may include a video terminal 1004, a keyboard 1006, a pointing device, such as a mouse 1008, and the like. The processing unit preferably includes a central processing unit 1002, a memory, and stored instructions which implement the method for optimized design of the HVAC air-handling assembly 10, according to the present invention. The stored instructions may be stored within the processing unit 1002 in the memory, or in any non-volatile storage such as magnetic or optical media, EPROM, EEPROM, or the like. Alternatively, instructions may be loaded from removal magnetic media 1010, such as a removal disk, sometimes called a floppy disk, optical media 1012, or the like. In a preferred embodiment, the system 1000 includes a general-purpose computer program to implement the functions illustrated and described with reference to FIGS. 1 through 5. Of course, a system 1000, according to the present invention, could also be embodied with a dedicated device which includes various combinations of hardware and software. The preferred embodiment may also include a printer 1014 connected to the processing unit 1002, as well as a network connection for accessing a local server, an intranet, and the Internet. Preferably, solid modeling software, parametric design software, surface rendering software, animation software, and the like are used for developing the system 1000.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method of optimized design of an HVAC air-handling assembly for a climate control system on a vehicle, the method comprising the steps of:

generating a conceptual design of the HVAC air-handling assembly;

generating a basic design of the HVAC air-handling assembly based on the conceptual design;

analyzing a performance of the basic design of the HVAC air-handling assembly using an engineering analytical technique;

varying the basic design of the HVAC air-handling assembly based on the performance analysis until optimized; and using the optimized basic design of the HVAC air-handling assembly in generating the HVAC air-handling assembly design.

2. A method as set forth in claim 1 wherein said step of generating the basic design of the HVAC air-handling assembly includes generating a geometric representation of an airflow directing surface within the HVAC air-handling assembly using a computer-aided design technique.

3. A method as set forth in claim 1 wherein said step of generating the basic design includes parametrically determining a model of the HVAC air-handling assembly.

4. A method as set forth in claim 1 wherein said step of analyzing the performance includes using computational fluid dynamics to analyze the performance.

5. A method as set forth in claim 1 wherein said step of varying the basic design includes modifying a geometric representation of a surface of the HVAC air-handling assembly so that the performance of the HVAC air-handling assembly is optimized.

6. A method as set forth in claim 1 wherein said step of varying the basic design includes modifying a component within the HVAC air-handling assembly so that the performance of the HVAC air-handling assembly is optimized.

7. A method of optimized design of an HVAC air-handling assembly for a climate control system on a vehicle, the method comprising the steps of:

generating a conceptual design of the HVAC air-handling assembly;

generating a basic design of a parametric model of the HVAC air-handling assembly based on the conceptual design;

analyzing a performance of the basic design of the HVAC air-handling assembly using an engineering analytical technique;

varying the basic design of the HVAC air-handling assembly using the performance analysis until a performance criteria is optimized; and using the optimized basic design of the HVAC air-handling assembly in generating the HVAC air-handling assembly design.

8. A method as set forth in claim 7 wherein said step of generating a basic design includes generating a geometric representation of an airflow directing surface within the HVAC air-handling assembly.

9. A method as set forth in claim 7 wherein the step of analyzing the performance includes using computational fluid dynamics to analyze the performance.

10. A method as set forth in claim 7 wherein said step of varying the basic design includes modifying a geometric representation of the surface of the HVAC air-handling assembly so that the performance of the HVAC air-handling assembly is optimized.

11. A method as set forth in claim 7 wherein said step of varying the basic design includes modifying a component within the HVAC air-handling assembly so that the performance of the HVAC air-handling assembly is optimized.

12. A method as set forth in claim 7 wherein the performance criteria is temperature distribution within the HVAC air-handling assembly.

13. A method as set forth in claim 7 wherein the performance criteria is air flow distribution within the HVAC air-handling assembly.

14. A method of optimized design of an HVAC air-handling assembly for a climate control system on a vehicle, the method comprising the steps of:

generating a conceptual design of the HVAC air-handling assembly;

generating a basic design of a parametric model of the HVAC air-handling assembly based on the conceptual design, wherein the parametric model includes a geometric representation of an airflow directing surface within the HVAC air-handling assembly;

analyzing a performance of the basic design of the HVAC air-handling assembly using computational fluid dynamics;

varying the basic design of the HVAC air-handling assembly using the performance analysis until a performance criteria is optimized; and using the optimized basic design of the HVAC air-handling assembly in generating the HVAC air-handling assembly design.

15. A method as set forth in claim 14 wherein said step of varying the basic design includes modifying a geometric representation of the surface of the HVAC air-handling assembly so that the performance of the HVAC air-handling assembly is optimized.

16. A method as set forth in claim 14 wherein said step of varying the basic design includes modifying a component within the HVAC air-handling assembly so that the performance of the HVAC air-handling assembly is optimized.

17. A method as set forth in claim 14 wherein the performance criteria is temperature distribution within the HVAC air-handling assembly.

18. A method as set forth in claim 14 wherein the performance criteria is air flow distribution within the HVAC air-handling assembly.

* * * * *